March 19, 1935.  W. FERRIS ET AL  1,994,989
HYDRAULIC TRANSMISSION
Filed May 9, 1931  7 Sheets-Sheet 2

Inventors
WALTER FERRIS.
JOHN P. FERRIS.

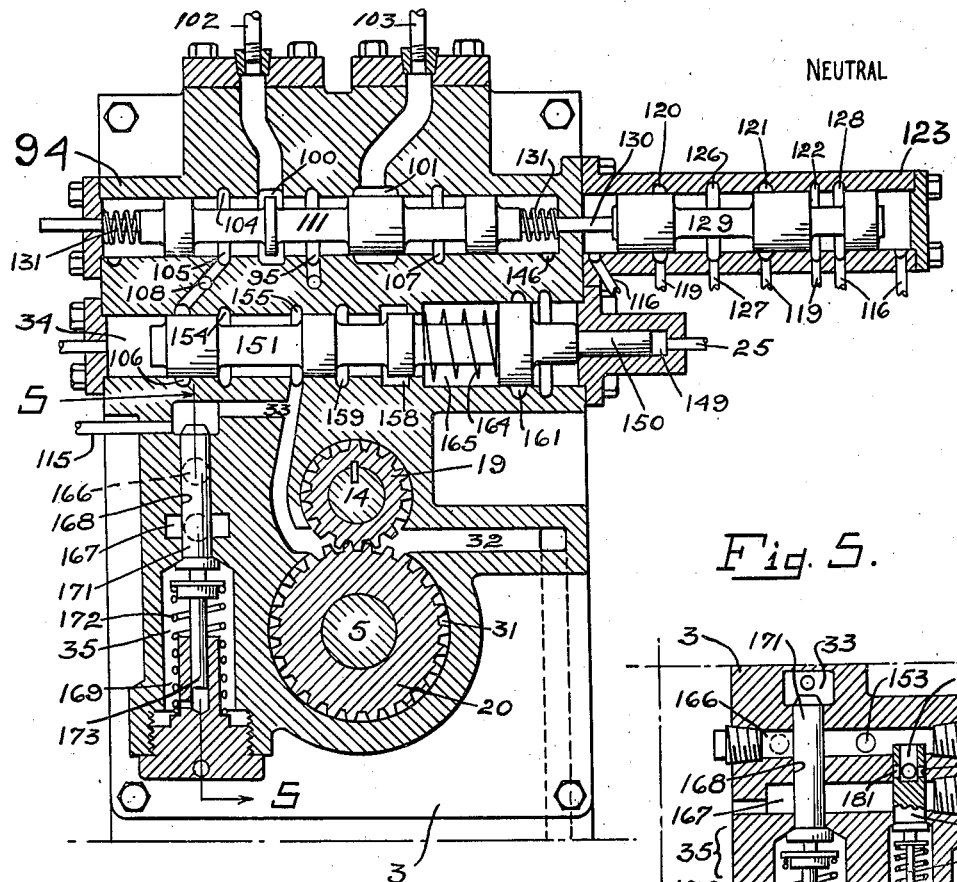
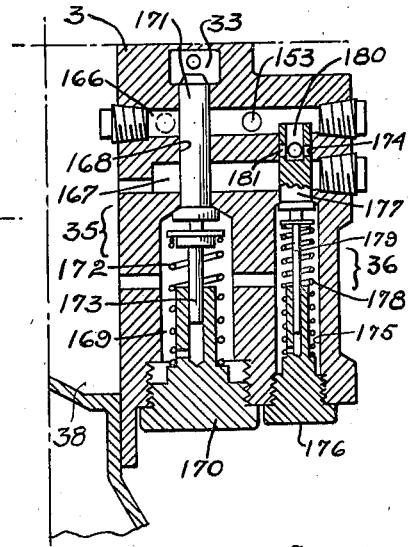

March 19, 1935.  W. FERRIS ET AL  1,994,989
HYDRAULIC TRANSMISSION
Filed May 9, 1931   7 Sheets-Sheet 4
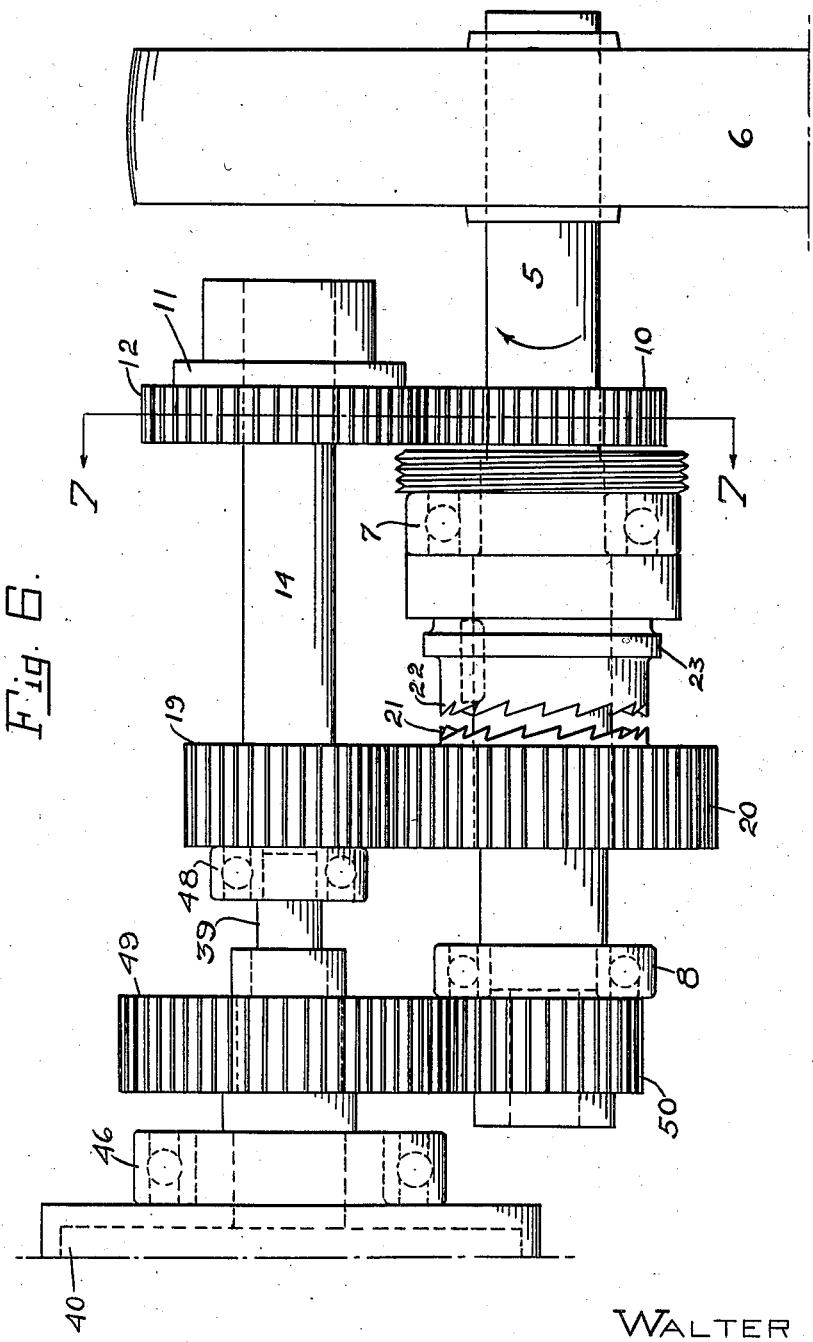
Inventors
WALTER FERRIS.
JOHN P. FERRIS.

March 19, 1935. W. FERRIS ET AL 1,994,989
HYDRAULIC TRANSMISSION
Filed May 9, 1931 7 Sheets-Sheet 5

RAPID TRAVERSE

Inventors
WALTER FERRIS.
JOHN P. FERRIS.
By Wesley P. Merrill
Attorney

March 19, 1935.  W. FERRIS ET AL  1,994,989

HYDRAULIC TRANSMISSION

Filed May 9, 1931  7 Sheets-Sheet 7

SLOW FEED

FEED

Inventors
WALTER FERRIS.
JOHN P. FERRIS.

Attorney

UNITED STATES PATENT OFFICE 1,994,989

HYDRAULIC TRANSMISSION

Walter Ferris, Milwaukee, and John P. Ferris, Whitefish Bay, Wis., assignors to The Oilgear Company, Milwaukee, Wis., a corporation of Wisconsin Application May 9, 1931, Serial No. 536,226

20 Claims. (Cl. 60—52)

This invention relates to hydraulic transmissions.

The transmission to which the invention applies in particular includes a pump unit having a multi-piston variable displacement pump which is capable of delivering high pressure liquid at uniform regulated rates throughout a limited range, a constant displacement auxiliary pump which is ordinarily driven in unison with the variable displacement pump and delivers a constant volume of low pressure liquid which is available for augmenting the delivery of the variable displacement pump and for other auxiliary purposes, and valves for controlling the delivery and operation of both pumps, such as the pump unit disclosed in Patent No. 1,974,137 issued September 18, 1934, to John P. Ferris and Ernst Wiedmann, and in Patent No. 1,619,200 issued March 1, 1927 (Reissue No. 19,095) to Walter Ferris.

Such pump units are now used extensively for operating machine tools and, more particularly, for operating the feeding mechanisms thereof.

The output of the variable displacement pump is employed by itself for effecting an accurately regulated feed movement, and the output of the auxiliary pump is ordinarily employed for keeping the return side of the hydraulic circuit flooded and for operating the control mechanism, and is sometimes added to the output of the variable displacement for effecting rapid traverse movements.

When the output of the auxiliary pump is used for rapid traverse purposes, the auxiliary pump must be capable of delivering a volume of liquid considerably in excess of the volume required to perform the other functions and, during the greater part of the time that the pump unit is in operation, this excess liquid is exhausted through a low pressure relief valve, thereby dissipating a substantial amount of energy stored in the excess liquid and causing this energy to reappear as heat.

Considerably greater rapid traverse speeds are now demanded than formerly and, when these high speeds are produced by liquid supplied from a single auxiliary pump, the energy dissipated at the low pressure relief valve during non-rapid traverse periods is so great that the entire body of working liquid becomes over-heated with resultant inaccuracy and lack of smoothness in the feeding movements. The power loss is also excessive.

The above objections have been overcome in the past by providing an additional auxiliary pump for rapid traverse functions and operating this pump without a substantial amount of back pressure during non-rapid traverse periods. This allows a small auxiliary pump to be employed for supercharging and control functions but increases the cost of the pump unit and entails additional expense for maintenance and power consumption.

An object of the invention is to so drive the auxiliary pump as to obtain ample volume for rapid traverse purposes without dissipating an undue amount of energy during idle periods.

Another object is to conserve energy which has been wasted heretofore.

Another object is to automatically increase or decrease the delivery of the auxiliary pump as the demand for the liquid delivered thereby increases or decreases.

Another object is to provide control means for automatically controlling the pump unit during a cycle or successive cycles of operation in each of which certain functions are performed in a predetermined sequence.

Another object is to maintain an operating pressure within the control system while the output of the auxiliary pump is being employed for rapid traverse purposes.

Another object is to provide a predetermined resistance to the flow of liquid through the return side of the hydraulic circuit during the working period or periods of each cycle of operation and to automatically remove this resistance during idle or rapid traverse periods.

Such a resistance prevents a driven part of a machine tool from being advanced ahead of its predetermined feeding rate during the working period, and removal of the resistance during the idle or rapid traverse period avoids heating the driving liquid and conserves energy.

Other objects and advantages will appear hereinafter.

According to one aspect of the invention, the auxiliary pump is operated at high speed when its output is employed for rapid traverse purposes and operated at slow speed when its output is not so employed.

According to another aspect of the invention, the two pumps are automatically controlled to deliver predetermined volumes at predetermined periods during a cycle of operation.

According to another aspect of the invention, the liquid in the exhaust side of the circuit is passed through a resistance during rapid traverse periods in order to maintain in the circuit sufficient pressure for operating hydraulic controls.

An illustrative embodiment of the present invention is shown in the accompanying drawings in which the views are as follows:

Fig. 4 is a vertical section, taken on the irregular line 4—4 of Fig. 1, showing the auxiliary or gear pump and certain valves.

Fig. 5 is a section on the line 5—5 of Fig. 4.

Fig. 6 is a view of the mechanism which drives both the variable delivery pump and the auxiliary pump.

Figure 1:
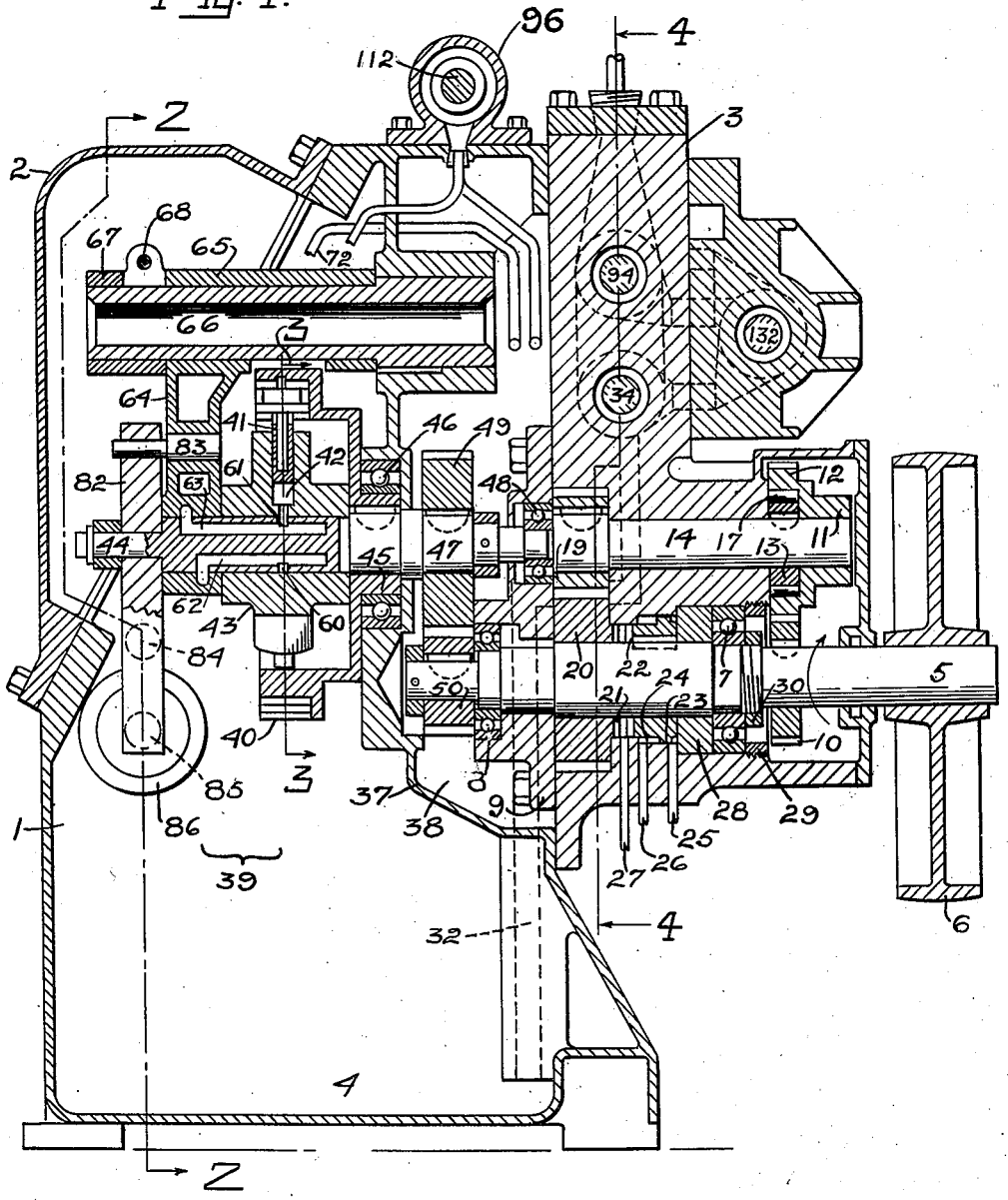
Fig. 1 is a central vertical section through a pump unit in which the invention is embodied, as indicated by the line 1—1 of Fig. 2.
Figure 2:
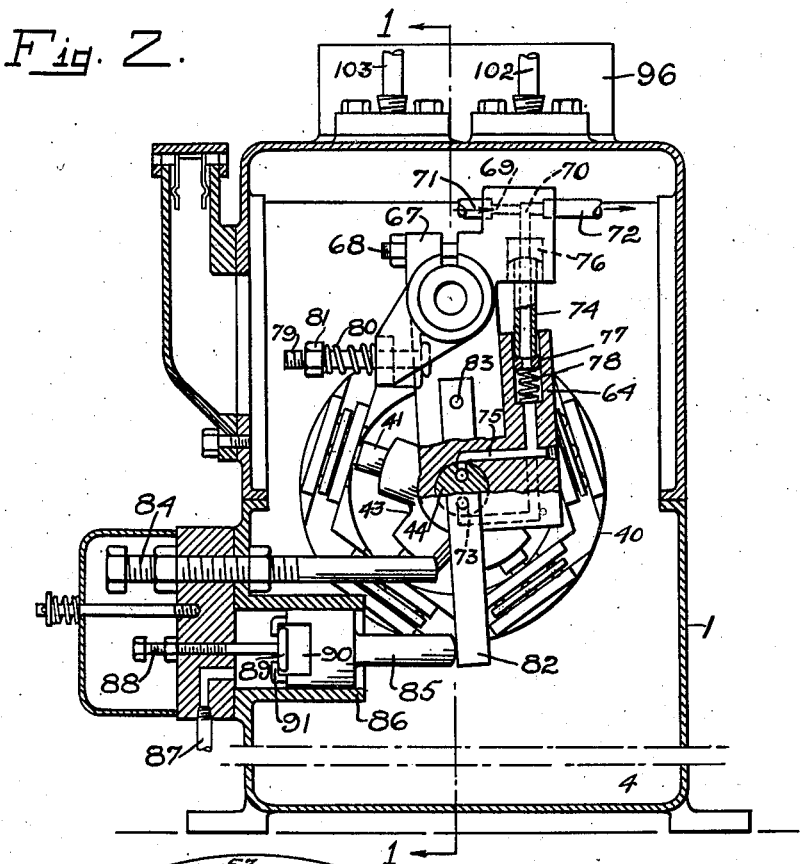
Fig. 2 is a sectional end view of the variable delivery pump mechanism, taken on the irregular line 2—2 of Fig. 1.

The pump unit shown in Figs. 1 to 7 has its mechanism carried by a casing 1 having at its upper rear corner a removable part 2 which may be removed to provide ready access to the variable delivery pump, a removable front plate 3 which carries the auxiliary pump and the driving mechanism, and a sump or reservoir 4 which is formed in its lower part and from which liquid is supplied to the pumps.

The pumps are driven by a drive shaft 5 which is driven from an outside source of power, as by means of a pulley 6. The shaft 5 is supported by an anti-friction thrust bearing 7 arranged in the front plate 3 and by an anti-friction bearing 8 arranged in a bearing block 9 which is attached to the inner face of the front plate 3.

Figure 7:
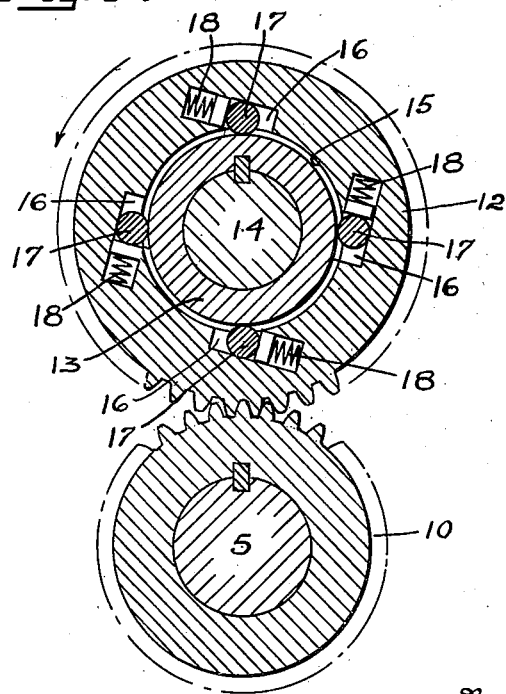
Fig. 7 is a section on the line 7—7 of Fig. 6 and shows an overrunning clutch which forms part of the auxiliary pump driving mechanism.

The drive shaft 5 has a gear 10 fixed thereon in mesh with the outer or driving part 11 of a clutch gear 12 which has its inner or driven part 13 fixed upon a driven shaft 14 journaled in the front plate 3, as shown in Figs. 1, 6 and 7.

The clutch gear 12 constitutes an overrunning clutch which enables the shaft 5 to drive the shaft 14 at one speed through the gears 10 and 12 and allows the shaft 14 to rotate at a higher speed than the shaft 5 independently of the gear 10.

As shown, the outer or driving part 11 of the gear 12 is journaled upon the shaft 14 and provided with a counterbore 15, in which the inner or driven part 13 is arranged, and a number of tangentially inclined cam slots 16 which are open at the narrow ends thereof to the counterbore 15.

Each slot 16 contains a clutch roller 17 which is urged toward the narrow end of its slot 16 and into engagement with the outer periphery of the driven part 13 by a spring 18.

Whenever the driving part 11 tends to rotate in the direction of the arrow faster than the driven part 13, each roller 17 is carried toward the narrow end of its slot 16 and wedged between the wall of the slot and the outer periphery of the driven part 13, thereby fixing the driven part 13 to the driving part 11 and causing it to rotate in unison therewith.

Whenever the driven part 13 is rotated in the direction of the arrow at a speed greater than that of the driving part 11, the rollers 17 are moved by frictional contact with the driven part 13 toward the large end of the slot 16 and the driven part 13 is allowed to rotate substantially free from the driving part 11.

The shaft 14 has a pump gear 19 fixed upon its inner end in mesh with a larger pump gear 20 which is journaled upon the drive shaft 5 and has the driven part 21 of a jaw clutch secured thereto or formed integral therewith.

The driving part 22 of the jaw clutch is splined upon the drive shaft 5 and provided with a piston 23 which is fitted in a cylinder 24 formed in the front plate 3 concentric to the shaft 5.

When the jaw clutch is engaged, the pump gears 19 and 20 are rotated at high speed direct from the shaft 5 and the driven member 13 of the clutch gear 12 rotates faster than the driving member 11 thereof and, when the jaw clutch is disengaged, the pump gears 19 and 20 are rotated at slow speed and the shaft 5 rotates within and faster than the gear 20.

The jaw clutch is engaged by pressure liquid which is delivered through a pipe 25 to the outer or front end of the cylinder 24 and acts upon the piston 23 to force the driving part 22 inwardly or rearwardly, and it is disengaged by pressure liquid which is delivered through a pipe 26 to the inner or rear end of the cylinder 24 and acts upon the piston 23 to force the driving part 22 outwardly or forwardly.

In order to allow the driving part 22 of the jaw clutch to move freely into and out of engagement with the driven part 21, a drain pipe 27 is provided through which air and entrapped liquid may flow.

The rear end of the cylinder 24 is closed by a bearing ring 28 through which the shaft 5 extends, and the shaft 5 is held against axial movement by the thrust bearing 7 which has its outer race held against the ring 28 by a locking ring 29 threaded in the front plate 3 and its inner race held against a shoulder on the shaft 5 by a locknut 30 threaded on the shaft 5.

The pump gears 19 and 20 are arranged in a pump chamber 31 which is formed in the front plate 3 and closed at its rear side by the bearing block 9.

The pump gears 19 and 20 and the pump chamber 31 constitute a conventional gear pump which draws its liquid from the reservoir 4 through an intake passageway 32 formed in the front plate 3, and it discharges its liquid into a discharge passageway 33 also formed in the front plate 3 and connecting the pump chamber 31 to a rapid traverse valve 34 and to a high pressure relief valve 35 which has a low pressure relief valve 36 connected in series therewith.

The casing 1 has a partition 37 arranged therein rearwardly from the front plate 3 and connected at its upper end to the top of the casing 1 and at its lower end to the front of the casing 1 adjacent the lower end of the front plate 3, the space between the front plate 3 and the partition 37 serving as an auxiliary reservoir 38.

The partition 37 provides a support for a variable delivery pump 39 which is driven by the shaft 5 and is substantially the same as the variable delivery pump disclosed in Patent No. 1,974,137 referred to above.

The pump 39 has a recessed circular driver 40 for reciprocating a number of pistons 41 which are fitted in cylinders 42 formed in a cylinder barrel 43 carried by a pintle 44.

The driver 40 has a hub 45 which is journaled in the partition 37 by means of an anti-friction bearing 46 and fixed upon one end of a shaft 47 the other end of which is supported in an anti-friction bearing 48 carried by the bearing block 9.

The shaft 47 has a gear 49 fixed thereon which meshes with a pinion 50 fixed on the inner or front end of the drive shaft 5 whereby the shaft 47 and the driver 40 are rotated continuously from the drive shaft 5.

Each of the pistons 41 has a push pin 51 loosely fitted therein and provided at its outer end with a crosshead 52 the inner face of which bears against a flat face 53 formed on the flange 54 of the driver 40 tangential to the axis of the piston 41.

A roller bearing 55 is arranged between the outer face of each crosshead 52 and the inner face of a bearing plate 56 which is carried by a segmental lug 57 formed on the driver 40 at the outer edge thereof and having its inner face parallel to the face 53 to allow the crosshead 52 and the roller bearing 55 to move along the face 53.

The axis of the pintle 44 is normally eccentric to the axis of the driver 40, and rotation of the driver 40 causes reciprocation of the pistons 41 in the cylinders 42 and delivery of liquid by the pump.

The displacement and volumetric delivery of the pump is determined by the degree of eccentricity between the axes of the pintle and the driver and, when these axes coincide, the pump is at zero stroke and no liquid will be delivered.

The cylinder barrel 43 has an axial bore 58 in which the pintle 44 is fitted, and each cylinder 42 communicates at its inner end with the bore 58 through a port 59.

Each cylinder port 59 registers alternately with a segmental intake port 60 and a segmental discharge port 61 which are formed diametrically opposite each other in the pintle 44 and communicate, respectively, with an intake passageway 62 and a discharge passageway 63 which are formed in the pintle 44 and extend longitudinally thereof.

Figure 3:
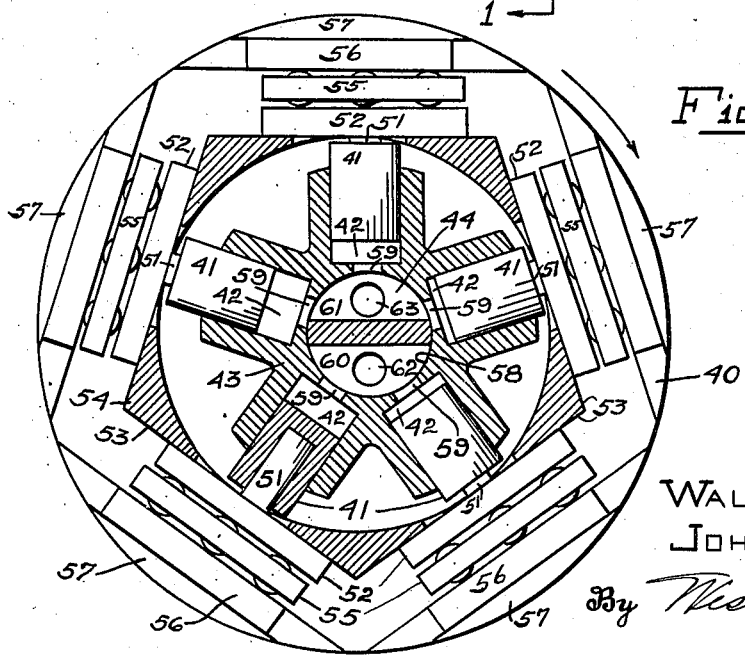
Fig. 3 is a section, taken on the line 3—3 of Fig. 1, showing the pistons and cylinders of the variable delivery pump.

The driver 40 is normally rotated in the direction of the arrow shown in Fig. 3 and it carries the entire piston and cylinder assembly around the pintle 44 and causes the cylinder ports 59 to register alternately with the pintle ports 60 and 61.

The pintle 44 is normally positioned to the right of the axis of the driver 40, as viewed in Fig. 3, and each piston 41 is moved progressively outward as it moves from right to left through the lower half of its circular path, and it is forced progressively inward as it moves from left to right through the upper half of its circular path.

The pistons in the lower half of the rotating cylinder barrel 43 are moved outward by centrifugal force and by liquid delivered by the gear pump into their cylinders 42 through the passageway 62 and the ports 60 and 59. The pistons in the upper half of the rotating cylinder barrel 43 are forced inward by the bearing plates 56 acting upon their crossheads 52 through the bearings 55, and the inwardly moving pistons force liquid from their cylinders through the ports 59 and 61 and the passageway 63.

The pintle 44 is rigidly secured intermediate its ends in the lower end of a pendulum 64 which has a sleeve 65 secured to or formed integral with its upper end and journaled upon a hollow shaft 66 which is fixed at its front end in the partition 37 and extends rearwardly therefrom.

The shaft 66 has an arm 67 arranged upon its rear end and rigidly secured in position thereon, as by means of a clamping bolt 68.

The arm 67 is provided with an intake passageway 69 and a discharge passageway 70, and it has an intake pipe 71 and a discharge pipe 72 connected thereto in communication, respectively, with the passageways 69 and 70.

The discharge passageway 63 in the pintle 44 communicates with a discharge passageway 75, which is formed in the pendulum 64 and connected by a pipe 74 to the discharge passageway 70 in the arm 67, and the intake passageway 62 in the pintle 44 is similarly connected through an intake passageway 73 and a pipe 74 to the intake passageway 69 in the arm 67.

Each pipe 74 has its upper end ground to form a concavo-convex liquid-tight joint with a seat 76 which is fitted in the counterbored lower end of the upper passageway, and its lower end is ground to form a concavo-convex liquid-tight joint with a seat 77 which is fitted to slide in the counterbored upper end of the lower passageway.

The ends of the pipe and the seat are urged together to hold the joints therebetween tight by a helical compression spring 78 which is arranged between the lower seat 77 and the inner end of the counterbored part of the lower passageway.

The volumetric delivery of the variable delivery pump 39 is regulated by swinging the pendulum 64 upon the shaft 66 to vary the stroke of the pump, and stroke changing mechanism is provided which may be operated automatically to swing the pendulum 64 between two pre-set positions at one of which the pump is at a predetermined minimum stroke and at the other of which the pump is at a predetermined maximum stroke.

The stroke changing mechanism includes a bolt 79, which extends loosely through the stationary arm 67 and is connected at one of its ends to the pendulum 64, and a helical compression spring 80 which encircles the bolt 79 and has one of its ends bearing against the arm 67 and its other end bearing against a nut 81 which is threaded upon the free end of the bolt and adjustable to vary the tension of the spring 80.

The spring 80 urges the pendulum 64 to the left in respect to Fig. 3 and tends to move the pintle 44 toward and beyond its zero stroke position.

The pintle 44 has an arm 82 arranged upon its reduced rear end and held against rotation thereon by a pin 83 which rigidly secures the upper end of the arm 82 to the pendulum 64.

The lower end of the arm 82 is held by the spring 80 in engagement with either the end of a stop screw 84 or the end of a stroke changing plunger 85.

The stop screw 84 is threaded through a side wall of the casing 1 and held in adjusted positions therein by a suitable locknut, and it is ordinarily adjusted to hold the pintle 44 to the right of its zero stroke position a predetermined distance to thereby cause the pump to deliver a predetermined minimum volume, such for instance, as is required to operate a hydraulic feed motor at a predetermined feeding speed.

The stroke changing plunger 85 is fitted in a cylinder 86 which is carried by the casing 1 and supplied with liquid through a pipe 87.

The forward movement of the plunger 85 is limited by an adjusting screw 88 which is threaded through the head of the cylinder 86 and has an enlarged head 89 arranged within a recess 90 which is formed in the plunger 85 and flanked by inward flanges 91.

Pressure liquid delivered to the cylinder 86 moves the plunger 85 outwardly and swings the arm 82 to the right until the flanges 91 engage the head 89, and the screw 88 is ordinarily adjusted to allow the plunger 85 to swing the arm 82 to full stroke position.

Figure 8:
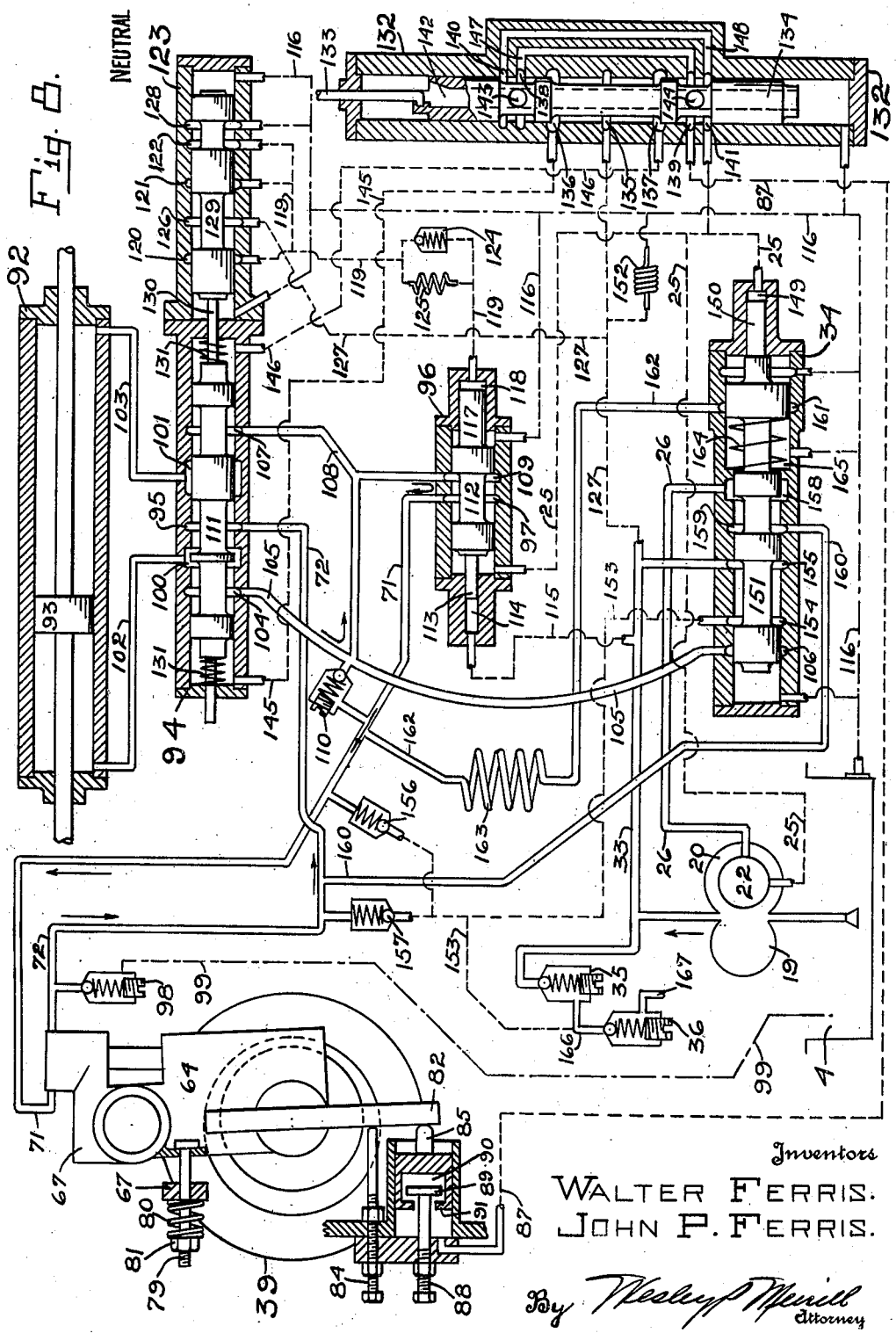
Fig. 8 is a diagram showing schematically the hydraulic circuit of the pump unit and showing the several valves in longitudinal section with the plungers thereof in certain characteristic positions.

The pump 39 is thus adapted to deliver liquid at two different predetermined rates to operate one or more hydraulic motors, such as the motor 92 shown in Fig. 8, and the stop screw 84 is ordinarily so adjusted that the pump delivers liquid at the rate necessary to move the piston 93 of the motor 92 at a predetermined slow speed or feeding rate.

Liquid from the pump 39 is delivered to the motor 92 through a reversing valve 94, which is shown as having its cylinder formed in the front plate 3 and provided with a port 95 to which the outer end of the discharge pipe 72 is connected, and this liquid may be returned to the intake of the pump 39 through a bypass valve 96 which is shown arranged upon the top of the casing 1 and provided with a port 97 to which the outer end of the intake pipe 71 is connected.

The pressure of the liquid delivered by the pump 39 is limited by a high pressure relief valve 98 which is adapted to open at a relatively high pressure, for instance 1000#, and has its inlet connected to the discharge pipe 72 intermediate the ends thereof and its outlet connected to the reservoir 4 by a drain pipe 99 as shown diagrammatically in Fig. 8.

The valve 94 has two ports 100 and 101 arranged upon opposite sides of the port 95 and connected, respectively, to opposite ends of the motor 92 by two pipes 102 and 103, a port 104 arranged between the port 100 and one end of the valve cylinder and connected by a duct 105 to a port 106 in the rapid traverse valve 34, and a port 107 arranged between the port 101 and the other end of the valve cylinder and connected by a pipe 108 to the duct 105 and to a port 109 in the bypass valve 96.

The duct 105 is also connected to the intake pipe 71 through a relief valve 110 which is adapted to open at a pressure, for instance 400#, which is considerably lower than the pressure at which the relief valve 98 will open.

The flow of liquid through the reversing valve 94 is controlled by its plunger 111, and the flow of liquid through the bypass valve 96 is controlled by its plunger 112.

When the plungers 111 and 112 are in the positions shown in Fig. 8, liquid delivered by the pump 39 flows through the pipe 72, the valve 94, the duct 105, the pipe 108, the valve 96 and the pipe 71 to the intake of the pump 39.

The left end of the motor 92 is open at this time to the pump 39 but the port 101 is closed by the plunger 111 and the liquid thus trapped in the right end of the motor 92 holds the piston 93 against movement under the action of the liquid in the left end of the motor and also against any external mechanical forces which may act against the rod of the piston 93.

The plunger 112 of the bypass valve 96 is held in the position shown in Fig. 8 by gear pump liquid exerting pressure upon a small piston 113 which is secured to the left end of the plunger 112 and fitted in a cylinder 114 arranged upon the left end of the valve casing.

The cylinder 114 is open at all times to gear pump pressure through a pipe 115 which is connected to the gear pump through the discharge passageway 33 and, when the plunger 112 is moved to the right, the liquid in the right end of the valve cylinder is exhausted into a drain pipe 116 which discharges into the reservoir 4.

The plunger 112 is adapted to be moved to the left by gear pump liquid acting upon a piston 117 which has a greater cross-sectional area than the piston 113 and is fitted in a cylinder 118 arranged upon the right end of the valve casing.

The cylinder 118 is connected by a pipe 119 to three ports 120, 121 and 122 which are formed in an auxiliary control valve 123 arranged upon the right end of the reversing valve 94.

The pipe 119 has a check valve 124 and a choke 125 connected therein in parallel with each other. The check valve 124 allows liquid to flow freely from the valve 123 to the cylinder 118 to move the plunger 112 rapidly to the left but prevents liquid from flowing in the opposite direction. The choke 125 restricts the flow of liquid from the cylinder 118 and thereby causes the plunger 112 to move more slowly when urged to the right.

The valve 123 has a port 126, which is arranged between the ports 120 and 121 and connected by a pipe 127 to the discharge passageway 33 of the gear pump, and a port 128 which is connected to the drain pipe 116 and is normally open to the port 122. The drain pipe 116 is also connected to the ends of the valve 123.

The flow of liquid through the valve 123 is controlled by its plunger 129 which is connected by a stem 130 to the plunger 111 of the reversing valve 94.

The stem 130 is slidably fitted in the end wall of the valve 94, and the plungers 111 and 129 are urged to the positions shown in Fig. 8 by two helical compression springs 131 which are arranged between the ends of the plunger 111 and the end walls of the valve cylinder.

The operation of the pump unit is controlled primarily by a main control valve 132 which is shown arranged upon the front plate 3 and provided with a stem 133 for moving the plunger 134 from one position to another.

The stem 133 may be operated by hand but it is ordinarily operated automatically in response to movements of the machine tool, such as movements produced by the motor 92.

The plunger 134 controls communication between an admission port 135 and six distributing ports 136, 137, 138, 139, 140 and 141, and it has a longitudinal passageway 142 extending from end to end thereof and intersected by two openings 143 and 144 which provide communication between the passageway 142 and certain of the ports at predetermined periods during each cycle of operation. One end of the valve 132 is connected to the drain pipe 116, and any of the ports which are open to an opening 143 or 144 are thus open to the drain pipe 116 through the passageway 142.

The port 135 is connected to the pipe 127 intermediate the ends thereof, the port 136 is connected by a pipe 145 to the left end of the reversing valve 94, and the port 137 is connected by a pipe 146 to the right end of the valve 94. When the plunger 134 of the control valve 132 is in the position shown in Fig. 8, the ports 136 and 137 are open to the port 135 and both ends of the valve 94 are open to gear pump pressure.

Figure 9:
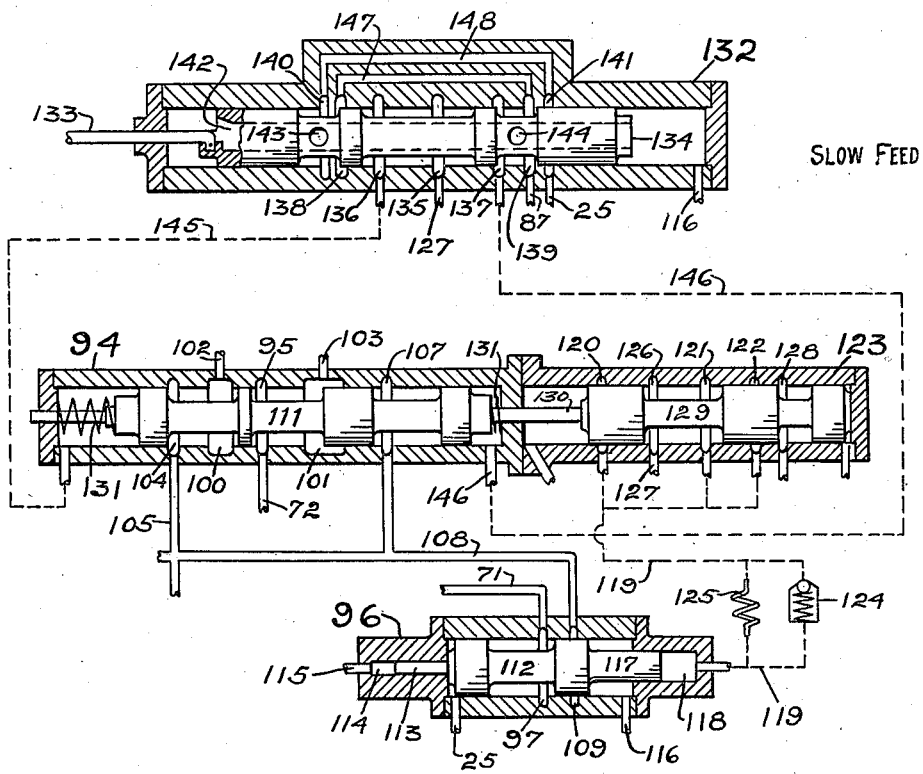

If the plunger 134 is moved outwardly or forwardly one step as shown in Fig. 9, the port 137 will be opened to the drain pipe 116 through the opening 144 and the passageway 142 to permit the escape of liquid from the right end of the valve 94. The port 136 will remain open to the port 135 and liquid from the gear pump will flow through the pipe 145 to the left end of the valve 94 and move the plungers 111 and 129 to the right.

If the plunger 134 is moved an equal distance in the opposite direction, the port 136 will be opened to the drain pipe 116 through the opening 143 and the passageway 142 and the port 137 will remain open to the port 135, thereby causing the plungers 111 and 129 to be moved to the left.

The ports 138 and 139 are connected to each other by a passageway 147, and the pipe 87 connects the stroke-changing mechanism of the pump 39 to the port 139. When the plunger 134 is operated to open either the port 138 or the port 139 to the port 135, liquid will be delivered to the stroke-changing mechanism and increase the stroke of the pump 39.

The ports 140 and 141 are connected to each other by a passageway 148, and the pipe 25 connects the speed changing clutch of the gear pump to the port 141.

The pipe 25 is also connected to the left end of the bypass valve 96 and to a cylinder 149 which is arranged at the right end of the rapid traverse valve 34 and has a piston 150 fitted therein and secured to the plunger 151 of the rapid traverse valve 34.

When the plunger 134 is operated to open either the port 140 or the port 141 to the port 135, liquid will be delivered simultaneously to the cylinder 24 in the front plate 3 to operate the jaw clutch and increase the speed of the gear pump; to the left end of the valve 96 to urge its plunger 112 to the right; and to the cylinder 149 on the rapid traverse valve 34 to urge its plunger 151 to the left.

Prior to operating the plunger 134 of the control valve 132, the gear pump is operating at slow speed and delivering liquid into the passageway 33 to maintain pressure in the pipes 115, 127, 145 and 146 but no flow of liquid occurs in this part of the circuit at this time except for a very limited volume of liquid which escapes through a small choke 152 connected between the pipe 127 and the drain pipe 116.

The pressure maintained at this time by the gear pump is limited by the low pressure relief valve 36 which has its inlet connected by a pipe 153 to a port 154 formed in the rapid traverse valve 34 and open at this time to a port 155 to which the discharge passageway 33 is connected.

The pipe 153 is also connected to the intake pipe 71 through a check valve 156 and to the discharge pipe 72 through a check valve 157.

The gear pump tends to deliver liquid through the check valves 156 and 157 into the circuit of the variable delivery pump 39 to compensate for leakage losses and the balance of the output of the gear pump, except for the small volume escaping through the choke 152, is exhausted through the relief valve 36 which maintains a predetermined low pressure, for instance 75#, in the gear pump circuit. This pressure prevails also in the circuit of the pump 39 due to the two circuits being connected through the check valves 156 and 157.

The driving part 22 of the gear pump jaw clutch is urged forwardly or away from the driven part 21 by liquid supplied to the cylinder 24 through the pipe 26 which has its other end connected to a port 158 in the rapid traverse valve 34.

The port 158 is open at this time to a port 159 which is connected by a pipe 160 to the discharge pipe 72 so that the driving part 22 of the jaw clutch is urged forwardly by the pressure which prevails in the discharge pipe 72 when the plunger 151 of the rapid traverse valve 34 is in the position shown in Fig. 8.

The valve 34 also has a port 161 which is connected by a pipe 162 to the intake pipe 71, and the pipe 162 has connected therein a choke coil 163 which is large enough to pass the whole output of the gear pump but is so proportioned that it will create a predetermined back pressure in the pipe 71, for instance 75#, when the gear pump is operating at high speed.

The plunger 151 of the rapid traverse valve 34 is urged to the position shown in Fig. 8 by a helical compression spring 164 which is arranged in a spring chamber 165 located between the ports 158 and 161. The spring chamber 165 and both ends of the valve cylinder are connected to the drain pipe 116 and, when the plunger 151 is in the position shown in Fig. 8, it blocks communication between the drain pipe 116 and the valve ports.

When the plunger 134 of the control valve 132 is operated to open the pipe 25 to the gear pump, equal pressures prevail upon each side of the piston 23 in the cylinder 24 until the liquid entering the cylinder 149 through the pipe 25 forces the plunger 151 of the rapid traverse valve 34 far enough to the left to close the port 158 to the port 159 and open it to the drain pipe 116. Then liquid flows through the pipe 25 to the front end of the cylinder 24 and forces the driving part 22 of the jaw clutch into engagement with the driven part 21 and causes the gear pump to operate at high speed, the liquid in the rear end of the cylinder 24 being exhausted through the pipe 26 and the valve 34 to the drain pipe 116.

Figure 11:
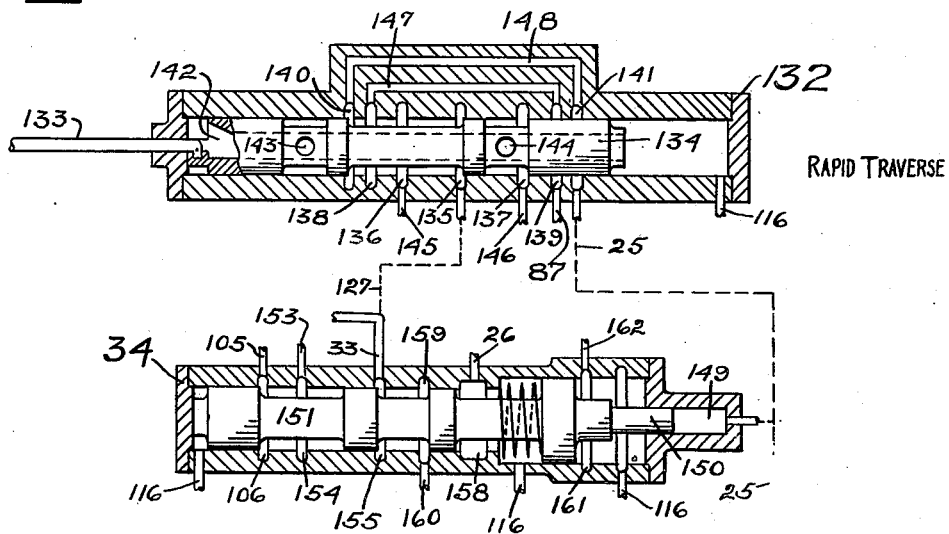
Figs. 9, 10 and 11 are longitudinal sections through certain valves showing the plungers thereof in characteristic positions different from those shown in Fig. 8.

The liquid entering the cylinder 149 continues to force the plunger 151 to the left against the resistance of the spring 164 until it reaches the position shown in Fig. 11.

The plunger 151 being to the left, the port 159 is open to the port 155 and the gear pump may deliver liquid at its full capacity through the passageway 33, the valve 34 and the pipe 160 to the circuit of the pump 39; the port 161 is open to the drain pipe 116 and liquid may be exhausted from the circuit of the pump 39 through the pipe 162, the choke 163 and the valve 34; and the port 155 is closed to the port 154 so that any excess liquid delivered by the gear pump must be exhausted through both of the relief valves 35 and 36, the resistance of which determines the maximum pressures which can be developed by the gear pump.

The relief valve 35 is adapted to open at a pressure for instance 300#, which is higher than the pressure at which the relief valve 36 will open and, as these valves are connected in series, the gear pump may develop pressures up to the total pressure required to open both valves, for instance 375#.

The valves 35 and 36 are ordinarily arranged in the front plate 3, as shown in Figs. 4 and 5, and control communication between the discharge passageway 33, a communication duct 75

166, and an exhaust passageway 167. The exhaust passageway 167 discharges into the auxiliary reservoir 38.

The discharge passageway 33 is connected to the communication duct 166 by a bore 168 which intersects the exhaust passageway 167 and opens into a spring chamber 169 which is closed at its lower end by a plug 170.

The bore 168 has a plunger 171 fitted therein which is exposed at its upper end to the pressure in the passageway 33 and urged upwardly to close communication between the passageway 33 and the duct 166 by a helical compression spring 172 arranged in the spring chamber 169 and supported at its lower end by the plug 170.

The plunger 171 is provided at its lower end with a pin 173 which limits its downward movement and prevents it from opening communication between the communication duct 166 and the exhaust passageway 167.

The communication duct 166 is connected to the exhaust passageway 167 by a bore 174 which opens into a spring chamber 175 having its lower end closed by a plug 176.

The bore 174 has a plunger 177 fitted therein which is exposed at its upper end to the pressure in the duct 166 and urged upwardly, to close communication between the duct 166 and the passageway 167, by a helical compression spring 178 arranged in the spring chamber 175 and supported at its lower end by the plug 176.

The plunger 177 has its lower end provided with a pin 179 to limit its downward movement and its upper end provided with an axial bore 180 and side outlets 181 through which liquid may flow from the duct 166 to the passageway 167 when the plunger 177 is depressed a short distance.

When the pipe 153 is open to the gear pump, a predetermined maximum pressure, for instance 75#, will depress the plunger 177 and allow liquid to flow from the duct 166 through the bore 180 and the outlets 181 into the exhaust passageway 167.

When the pipe 153 is not open to the gear pump, a predetermined maximum pressure, for instance 300#, will depress the plunger 171 and open the passageway 33 to the duct 166. Then the liquid in the duct 166 must exert an additional pressure, for instance 75#, upon the plunger 177 to open the duct 166 to the exhaust passageway 167.

Assuming that the drive shaft 5 of the pump unit is rotating at a constant speed and that the relief valves and chokes have the resistances assumed, the operation of the pump unit is as follows:

With the plunger 134 of the control valve 132 in the position shown in Fig. 8, the piston 93 is held against movement by the liquid trapped in the right end of the motor 92, the plunger 111 of the reversing valve 94 is held in its central or neutral position by the springs 131, the plunger 112 of the bypass valve 96 is held to the right by gear pump pressure, the plunger 151 of the rapid traverse valve 34 is held to the right by its spring 164, the variable delivery pump 39 is operating at short stroke and the liquid delivered thereby is bypassed to its intake through the valve 96, the gear pump is operating at slow speed and maintaining a pressure of 75# in both circuits, and the driving part 22 of the gear pump jaw clutch is held out of engagement with the driven part 21 by gear pump pressure.

If the stem 133 of the control valve 132 is drawn outwardly to move the plunger 134 one step forwardly to the position shown in Fig. 9, the right end of the reversing valve 94 is opened to the drain pipe 116 and gear pump liquid supplied through the valve 132 and the pipe 145 to the left end of the valve 94 forces the plungers 111 and 129 to the right and opens the port 121 to the port 126 so that gear pump liquid flows through the valve 123 and the pipe 119 to the cylinder 118 on the bypass valve 96 and, as the cylinder 118 is larger than the cylinder 114, the total force exerted upon the piston 117 is greater than the force exerted upon the piston 113 and the plunger 112 is moved to the left.

The port 101 in the reversing valve 94 is now open to the port 95 and liquid from the pump 39 enters the right end of the motor 92 and moves its piston 93 to the left at a predetermined feeding rate corresponding to the volumetric delivery of the pump 39 which is determined by the adjustment of the stop screw 84.

The port 109 in the bypass valve 96 is closed to the port 97 and the liquid expelled from the left end of the motor 92 is forced through the resistance valve 110 into the intake pipe 71, the valve 110 maintaining the exhaust liquid at a predetermined pressure, for instance 400#, which prevents the piston 93 from moving at an irregular rate due to variations in tool resistance.

Any leakage loss in the circuit of the pump 39 is compensated for by liquid supplied to the pipe 71 through the check valve 156 from the gear pump which maintains a pressure of 75# therein and in its own circuit, the excess liquid delivered by the gear pump being exhausted through the relief valve 36.

Figure 10:
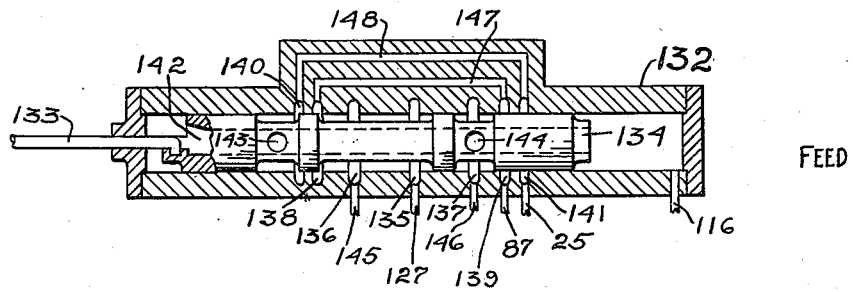

If the plunger 134 of the control valve 132 is moved forwardly another step to the position shown in Fig. 10, the port 138 is open to the port 135 and liquid flows through the passageway 147, the port 139 and the pipe 87 to the cylinder 86 and forces the stroke changing plunger 85 forwardly to increase the stroke of the pump 39 to the maximum determined by the adjustment of the screw 88.

The pump 39 then delivers liquid to the motor 92 at an increased rate and the piston 93 is advanced at a faster speed corresponding to the increase in pump delivery. No other change is made in the circuit.

If the stem 133 is drawn outwardly to the limit of its movement to move the plunger 134 of the control valve 132 to its third position, as shown in Fig. 11, the port 140 is open to the port 135 and gear pump liquid flows through the passageway 148, the port 141 and the pipe 25 to the front end of the cylinder 24 in the front plate 3, to the left end of the bypass valve 96 and to the cylinder 149 on the rapid traverse valve 34.

The liquid delivered to the left end of the valve 96 and to the cylinder 114 acts upon a greater cross sectional area of the plunger 112 than the liquid in the cylinder 118, and the plunger 112 is urged to the right. The movement of the plunger 112 is retarded by the resistance of the choke 125 to the passage therethrough of the exhaust liquid from the cylinder 118, and the driving part 22 of the jaw clutch is temporarily held against movement by the liquid supplied to the rear end of the cylinder 24 through the pipe 26. Therefore, liquid delivered to the cylinder 149 moves the plunger 151 of the rapid traverse valve 34 instantly to the left to the position shown in Fig. 11.

The port 158 is now open to the drain pipe 116 and the liquid supplied to the front end of the cylinder 24 moves the driving part 22 of the jaw clutch into engagement with the driven part 21 thereof and causes the gear pump to operate at high speed, the liquid in the rear end of the cylinder 24 being exhausted through the pipe 26 and the valve 34 to the drain pipe 116.

The port 155 is now closed to the port 154 and open to the port 159 so that the gear pump delivers liquid at full volume through the passageway 33, the valve 34 and the pipe 160 to the pipe 72 where it joins the output of the pump 39 and operates the motor 92 at high speed. Any excess liquid delivered by the gear pump must be exhausted through both of the relief valves 35 and 36 so that the gear pump may deliver liquid at pressures up to 375#.

The liquid expelled from the exhaust end of the motor 92 flows through the pipe 102, the duct 105, the pipe 108 and the bypass valve 96 into the pipe 71. A sufficient volume of this liquid to supply the pump 39 flows to the intake thereof through the pipe 71 and the remainder of this liquid flows through the pipe 162 and the rapid traverse valve 34 to the drain pipe 116. As the gear pump is delivering liquid at its full capacity, the coil 163 in the pipe 162 maintains the liquid in the gear pump circuit at a pressure of 75# which is available for operating the valves and the jaw clutch.

When the plunger 134 of the control valve 132 is returned to its central or neutral position, the ports 136 and 137 are both open to the port 135 so that the same pressure prevails in both ends of the reversing valve 94 and the springs 131 return the plungers 111 and 129 to their neutral positions. The pipes 25 and 87 are open to the drain pipe 116 through the ports 141 and 139, the opening 144 and the passageway 142, and the spring 164 returns the plunger 151 of the rapid traverse valve 34 to its initial position.

Returning the plunger 151 to its initial position opens the discharge passageway 33 to the low pressure relief valve 36, closes the ports 106 and 161, and opens the port 159 to the port 158 to allow pressure liquid to flow to the rear end of the cylinder 24 and disengage the jaw clutch so that the gear pump is driven at slow speed.

Returning the plunger 129 to its initial position opens the cylinder 118 to the drain pipe 116 and allows the liquid in the cylinder 114 to hold the plunger 112 to the right.

The plunger 134 of the control valve 132 has three positions upon each side of its central or neutral position and, when the plunger is at any one of the positions upon one side of the center, the pump unit operates in exactly the same way as when the plunger is at the corresponding position upon the opposite side of center except that the piston 93 of the motor 92 is moved in the opposite direction.

Also, the plunger 134 may be moved from its central or neutral position to any one of the six positions and then moved from that position to other positions in any sequence desired in order to operate the motor at different speeds and directions in any desired sequence, for instance, it may be drawn outwardly to its third position to cause the motor piston to advance at rapid traverse speed, then moved inwardly to its first position to cause the motor piston to advance at slow feeding speed, then moved outwardly to its intermediate position to cause the motor piston to advance at fast feeding speed, and then moved inwardly to its third position upon the opposite side of center to cause the motor piston to retract at rapid traverse speed.

The invention herein set forth is susceptible of various modifications and adaptations without departing from the scope thereof as hereafter claimed.

The invention is hereby claimed as follows:

1. The combination, with a hydraulic circuit, of a pump unit comprising a variable displacement pump for supplying driving liquid to said circuit, means for varying the displacement of said pump, an auxiliary pump for supplying liquid to said circuit, means for driving said pumps in unison, and means operated by liquid supplied by one of said pumps for changing the speed of said auxiliary pump independently of the speed of said variable pump.

2. The combination, with a hydraulic circuit, of a pump unit comprising a variable displacement pump for supplying driving liquid to said circuit, means for varying the displacement of said pump between two preset adjustments, an auxiliary pump for supplying liquid to said circuit, means for driving said pumps in unison, and means operated by liquid supplied by one of said pumps for changing the speed of said auxiliary pump between a predetermined high speed and a predetermined low speed independently of the speed of said variable pump.

3. The combination, with a hydraulic circuit, of a pump unit comprising a variable displacement pump for supplying driving liquid to said circuit, means for varying the displacement of said pump, a shaft for driving said pump, a gear pump for supplying liquid to said circuit to augment the output of said variable pump driven from said shaft and having one of its gears arranged thereon, and means operated by liquid supplied by one of said pumps for changing the speed of said gear pump independently of the speed of said variable pump.

4. The combination, with a hydraulic circuit, of a pump unit comprising a variable displacement pump for supplying driving liquid to said circuit, means for varying the displacement of said pump, a shaft for driving said pump, a gear pump for supplying liquid to said circuit to augment the output of said variable pump, means operated by liquid supplied by one of said pumps for connecting one gear of said gear pump to said shaft to be driven thereby at the same speed as said shaft, and means for driving said gear from said shaft at a different speed.

5. The combination, with a hydraulic circuit having a hydraulic motor connected therein, of a pump unit comprising a feed pump for supplying driving liquid to said circuit to operate said motor at slow speed, a shaft rotating at a constant speed for driving said pump, an auxiliary pump driven by said shaft, means operated by liquid supplied by one of said pumps for changing the speed of said auxiliary pump to thereby vary its volumetric delivery, and means for adding the liquid discharged by said auxiliary pump to the liquid discharged by said feed pump at a predetermined period in a cycle of operation to thereby operate said motor at high speed.

6. The combination, with a hydraulic circuit having a hydraulic motor connected therein, of a feed pump for supplying driving liquid to said circuit to operate said motor at slow speed, a shaft rotating at a constant speed for driving said pump, an auxiliary pump driven by said shaft, means for changing the speed of said auxiliary pump to thereby vary its volumetric delivery, means for adding the liquid discharged by said auxiliary pump to the liquid discharged by said feed pump at a predetermined period in a cycle of operation to thereby operate said motor at high speed, and means for controlling both of the aforesaid means and causing the same to operate at substantially the same time.

7. The combination, with a hydraulic circuit having a hydraulic motor connected therein, of a feed pump for supplying driving liquid to said circuit to operate said motor at slow speed, a shaft rotating at a constant speed for driving said pump, an auxiliary pump driven by said shaft, hydraulically operated means for changing the speed of said auxiliary pump to thereby vary its volumetric delivery, hydraulically operated means for adding the liquid discharged by said auxiliary pump to the liquid discharged by said feed pump at a predetermined period in a cycle of operation to thereby operate said motor at high speed, means for controlling both of the aforesaid means and causing the same to operate at substantially the same time, and means for maintaining a predetermined minimum pressure in said circuit during high speed periods to provide sufficient pressure to operate said hydraulically operated means.

8. The combination, with a hydraulic circuit having a hydraulic motor connected therein, of a feed pump for supplying driving liquid to said circuit to operate said motor at slow speed, a shaft rotating at a constant speed for driving said pump, an auxiliary pump driven by said shaft, means for changing the speed of said auxiliary pump to thereby vary its volumetric delivery, means for adding the liquid discharged by said auxiliary pump to the liquid discharged by said feed pump at a predetermined period in a cycle of operation to thereby operate said motor at high speed, a high pressure relief valve connected in said circuit and automatically opened to said auxiliary pump during high speed operation of said motor, and a low pressure relief valve connected in said circuit and automatically opened to said auxiliary pump during slow speed operation of said motor, and means for operating both of the aforesaid means and causing the first mentioned means to operate instantly after the second mentioned means has been operated.

9. The combination, with a hydraulic circuit having a hydraulic motor connected therein, of a feed pump for supplying driving liquid to said circuit to operate said motor at slow speed, a shaft rotating at a constant speed for driving said pump, an auxiliary pump driven by said shaft, hydraulically operated means for changing the speed of said auxiliary pump to thereby vary its volumetric delivery, hydraulically operated means for adding the liquid discharged by said auxiliary pump to the liquid discharged by said feed pump at a predetermined period in a cycle of operation to thereby operate said motor at high speed, and a choke coil connectible to the exhaust side of said motor and proportioned to pass a volume of liquid equal to the entire output of said auxiliary pump when the same is operating at high speed and to maintain in said circuit sufficient pressure to operate said hydraulically operated means and to supercharge said feed pump.

10. The combination, with a hydraulic circuit, of a pump unit comprising a high pressure pump for supplying driving liquid to said circuit, a drive shaft for driving said pump, a gear pump for supplying liquid to said circuit to augment the output of said high pressure pump and having one of its gears arranged upon said shaft, a clutch operated by liquid supplied by one of said pumps for connecting said gear to said shaft and engageable to cause said gear to rotate at the same speed as said shaft, a driven shaft having the other pump gear fixed thereon, and other means for driving said driven shaft from said drive shaft to rotate the pump gear carried by said drive shaft at a speed different than the speed of said drive shaft upon said clutch being disengaged.

11. The combination, with a hydraulic circuit, of a pump unit comprising a high pressure pump for supplying driving liquid to said circuit, a drive shaft for driving said pump, a gear pump for supplying liquid to said circuit to augment the output of said high pressure pump and having one of its gears arranged upon said shaft, a clutch operated by liquid supplied by one of said pumps for connecting said gear to said shaft and engageable to cause said gear to rotate at the same speed as said shaft, a driven shaft having the other pump gear fixed thereon, and other means including an overrunning clutch for driving said driven shaft from said drive shaft to rotate the pump gear carried by said drive shaft at a speed different than the speed of said drive shaft upon the first mentioned clutch being disengaged.

12. The combination, with a hydraulic circuit, of a pump unit comprising a high pressure pump for supplying driving liquid to said circuit, a drive shaft for driving said pump, a gear pump for supplying liquid to said circuit to augment the output of said high pressure pump and having one of its gears arranged upon said shaft, a clutch for connecting said gear to said shaft and engageable to cause said gear to rotate at the same speed as said shaft, hydraulic means operated by liquid supplied by said gear pump for operating said clutch, a driven shaft having the other pump gear fixed thereon, a gear carried by one of said shafts and rotatable independently thereof, a gear fixed upon the other shaft and meshing with the other gear, and means operable upon said clutch being disengaged for connecting said independently rotatable gear to its shaft to rotate therewith and cause said drive shaft to drive said driven shaft and thereby rotate the pump gear carried by said drive shaft at a speed different than the speed of said drive shaft.

13. The combination, with a hydraulic circuit, of a high pressure pump for supplying driving liquid to said circuit, a drive shaft for driving said pump, a driven shaft, a gear pump for supplying liquid to said circuit to augment the output of said high pressure pump and having one of its gears carried by said driven shaft to rotate therewith and its other gear carried by said drive shaft and rotatable independently thereof, a cylinder arranged around said drive shaft, a piston fitted in said cylinder and splined upon said drive shaft, a jaw clutch having its driving part fixed to said piston and its driven part fixed to the pump gear carried by said drive shaft, means for directing liquid into said cylinder upon opposite sides of said piston for moving said driving part into and out of engagement with said driven part, and means for driving said driven shaft from said drive shaft upon said jaw clutch being disengaged.

14. The combination, with a hydraulic circuit, of a high pressure pump for supplying driving liquid to said circuit, a drive shaft for driving said pump, a driven shaft, a gear pump for supplying liquid to said circuit to augment the output of said high pressure pump and having one of its gears carried by said driven shaft to rotate therewith and its other gear carried by said drive shaft and rotatable independently thereof, a cylinder arranged around said drive shaft, a piston fitted in said cylinder and splined upon said drive shaft, a jaw clutch having its driving part fixed to said piston and its driven part fixed to the pump gear carried by said drive shaft, means for directing liquid into said cylinder upon opposite sides of piston for moving said driving part into and out of engagement with said driven part, a gear carried by each of said shafts and meshing with the gear carried by the other shaft, means for fixing one of said gears to its shaft to rotate therewith, and an overrunning clutch for fixing the other gear to its shaft to rotate therewith and allowing said gear to rotate independently of said shaft upon said jaw clutch being engaged.

15. A hydraulic transmission, comprising a hydraulic circuit having a motor connected therein, a variable displacement pump for delivering liquid to said motor to operate the same and having mechanism for varying its displacement between two preset adjustments, a shaft for driving said pump at a constant speed, a two speed gear pump driven from said shaft and having hydraulic speed changing means, a hydraulically operated reversing valve for controlling said motor, a rapid traverse valve for adding the output of said gear pump to the output of said variable pump, and a control valve connected into said circuit and operable to direct liquid from said gear pump to said valves and said pump control mechanism and said speed changing means to operate the same.

16. A hydraulic transmission, comprising a hydraulic circuit having a motor connected therein, a variable displacement pump for delivering liquid to said motor to operate the same and having mechanism for varying its displacement between two preset adjustments, a shaft for driving said pump at a constant speed, a two speed gear pump driven from said shaft and having hydraulic speed changing means, a hydraulically operated reversing valve for controlling said motor, a hydraulically operated bypass valve connected into said circuit and operable to return said liquid to said variable pump without affecting said motor, a rapid traverse valve for adding the output of said gear pump to the output of said variable pump, and a control valve connected into said circuit and operable to direct liquid from said gear pump to said valves and said pump control mechanism and said speed changing means to operate the same.

17. A hydraulic transmission, comprising a hydraulic circuit having a motor connected therein, a variable displacement pump for delivering liquid to said motor to operate the same and having mechanism for varying its displacement between two preset adjustments, a shaft for driving said pump at a constant speed, a two speed gear pump driven from said shaft and having hydraulic speed changing means, a hydraulically operated reversing valve for controlling said motor, a hydraulically operated bypass valve connected into said circuit and operable to return said liquid to said variable pump without affecting said motor, a rapid traverse valve for adding the output of said gear pump to the output of said variable pump, a control valve connected into said circuit and operable to direct liquid from said gear pump to said valves and said pump control mechanism and said speed changing means to operate the same, and a plurality of means for maintaining pressure in said circuit at all times.

18. A hydraulic transmission, comprising a hydraulic motor, a variable feed pump for delivering liquid to said motor to operate it at slow speeds, a two speed gear pump driven in unison with said variable pump, means for changing the speed of said gear pump to thereby vary its delivery, a rapid traverse valve for combining the output of both pumps to operate said motor at high speed, a valve for reversing the direction of motor actuation, and means for controlling the operation of both of said valves and said speed changing means to cause the same to operate in a predetermined sequence.

19. A hydraulic transmission, comprising a hydraulic motor, a variable feed pump for delivering liquid to said motor to operate it at slow speeds, a two speed gear pump driven in unison with said variable pump, means for changing the speed of said gear pump to thereby vary its delivery, hydraulically actuated means for operating said speed changing means, a hydraulically operated valve for combining the output of both pumps to operate said motor at high speed, a hydraulically operated valve for reversing the direction of motor actuation, and a valve for controlling the delivery of liquid to said hydraulically actuated means and to both of said valves to cause the same to operate in a predetermined sequence.

20. A hydraulic transmission, comprising a motor, a variable feed pump for delivering liquid to said motor to operate it at slow speeds, a hydraulically operated bypass valve for short circuiting said feed pump to enable the same to operate without affecting said motor, a two speed gear pump driven in unison with said variable pump, means for changing the speed of said gear pump to thereby vary its delivery, hydraulically actuated means for operating said speed changing means, a hydraulically operated valve for combining the output of both pumps to operate said motor at high speed, a hydraulically operated valve for reversing the direction of motor actuation, and a valve for controlling the delivery of liquid to said hydraulically actuated means and to all of said valves to cause the same to operate in a predetermined sequence.

WALTER FERRIS.
JOHN P. FERRIS.